United States Patent [19]

Baird et al.

[11] Patent Number: 5,446,117
[45] Date of Patent: Aug. 29, 1995

[54] PROCESS FOR PRODUCING AMORPHOUS SYNDIOTACTIC POLYSTYRENE

[75] Inventors: Michael C. Baird, Kingston; Daniel J. Gillis, Harrowsmith; Ruhksana Quyoum, Kingston, all of Canada

[73] Assignee: Queen's University at Kingston, Kingston, Canada

[21] Appl. No.: 108,968

[22] Filed: Aug. 19, 1993

[51] Int. Cl.⁶ .................. C08F 4/643; C08F 12/08
[52] U.S. Cl. .................. 526/134; 526/131; 526/346; 526/902; 526/912; 264/328.1; 264/331.17
[58] Field of Search .......... 526/134, 132, 346, 902, 526/912, 131; 264/331.17, 328.1

[56] References Cited

U.S. PATENT DOCUMENTS

| | | | |
|---|---|---|---|
| 504,557 | 9/1891 | Campbell et al. | 502/103 |
| 3,301,839 | 1/1967 | Natta et al. | |
| 4,463,146 | 7/1984 | Donbar | 526/142 |
| 4,501,857 | 2/1985 | Kishimoto et al. | 525/338 |
| 4,680,353 | 7/1987 | Ishihara et al. | 526/160 |
| 4,751,275 | 6/1988 | Witte et al. | 526/139 |
| 4,808,680 | 2/1989 | Schmidt et al. | 526/160 |
| 4,892,851 | 1/1990 | Ewen et al. | 502/104 |
| 4,950,724 | 8/1990 | Malanga et al. | 526/144 |
| 4,959,435 | 9/1990 | Seitz et al. | 526/347.1 |
| 4,978,730 | 12/1990 | Maezawa et al. | 526/153 |
| 4,990,580 | 2/1991 | Ishihara et al. | 526/160 |
| 5,006,296 | 4/1991 | Pedersen | 264/210.7 |
| 5,023,304 | 6/1991 | Takeuchi et al. | 526/160 |
| 5,032,650 | 7/1991 | Yamamoto et al. | 526/79 |
| 5,037,907 | 8/1991 | Imabayashi et al. | 526/88 |
| 5,045,517 | 9/1991 | Campbell, Jr. et al. | 502/103 |
| 5,064,802 | 11/1991 | Stevens et al. | 502/155 |
| 5,066,741 | 11/1991 | Campbell, Jr. | 526/171 |
| 5,071,917 | 12/1991 | Pederson et al. | 525/241 |
| 5,071,953 | 12/1991 | Nakano et al. | 528/492 |
| 5,075,394 | 12/1991 | McDaniel et al. | 526/96 |
| 5,077,367 | 12/1991 | Campbell et al. | 526/284 |
| 5,082,717 | 1/1992 | Yaguchi et al. | 428/207 |
| 5,096,867 | 3/1992 | Canich | 502/103 |
| 5,100,983 | 3/1992 | Miyashita | 526/160 |
| 5,132,369 | 7/1992 | Yasuda et al. | 525/247 |
| 5,132,380 | 7/1992 | Stevens et al. | 526/126 |
| 5,132,381 | 7/1992 | Winter et al. | 526/160 |
| 5,142,005 | 8/1992 | Albizzati et al. | 526/125 |
| 5,155,080 | 10/1992 | Elder et al. | 502/152 |
| 5,157,092 | 10/1992 | Asanuma et al. | 526/348.4 |
| 5,162,278 | 11/1992 | Razavi | 502/152 |
| 5,164,479 | 11/1992 | Funaki et al. | 528/502 |
| 5,166,238 | 11/1992 | Nakano et al. | 524/120 |
| 5,169,893 | 12/1992 | Beck | 524/470 |
| 5,171,871 | 12/1992 | Miyashita | 556/27 |

FOREIGN PATENT DOCUMENTS

| | | | |
|---|---|---|---|
| 0231677 | 12/1958 | Australia | 9.4/7.9 |
| 0665018 | 6/1963 | Canada | 401/96 |

(List continued on next page.)

OTHER PUBLICATIONS

Makromol. Chem. Rapid Commun. 12 337–281 (1992).
Makromol. Chem. Rapid Commun. 13 265–268 (1992).

*Primary Examiner*—Fred Teskin
*Attorney, Agent, or Firm*—Richard J. Hicks

[57] ABSTRACT

High molecular weight syndiotactic polystyrene having greater than 96% syndiotacticity can be produced in very high yield (greater than 92%) by polymerizing styrene monomer, under rigorously anhydrous conditions, with a catalyst comprising Cp*M(CH$_3$)$_3$, where Cp* is a single $\eta^5$-cyclopentadienyl or an $\eta^5$-cyclopentadienyl group optionally covalently bonded to M through a substituent, and M is selected from Ti, Zr, Hf and a co-catalyst comprising B(C$_6$F$_5$)$_3$ dissolved in an aromatic solvent such as toluene or styrene, at carefully controlled temperatures in the range $-15°$ C. to $+50°$ C. The rapid rate of polymerization and high yield make the production of hard, rigid products by reaction injection moulding possible.

7 Claims, No Drawings

U.S. PATENT DOCUMENTS

| | | | |
|---|---|---|---|
| 0271874 | 6/1988 | European Pat. Off. | C08F 12/00 |
| 0271875 | 6/1988 | European Pat. Off. | C08F 12/00 |
| 0272584 | 6/1988 | European Pat. Off. | C08F 12/00 |
| 0276801 | 8/1988 | European Pat. Off. | C08F 12/00 |
| 0277003 | 8/1988 | European Pat. Off. | . |
| WO88/10275 | 12/1988 | European Pat. Off. | . |
| 0322663 | 7/1989 | European Pat. Off. | C08F 12/08 |
| 0412416 | 2/1991 | European Pat. Off. | C08F 210/06 |
| 3077905 | 4/1988 | Japan | . |
| 2102206 | 10/1988 | Japan | . |
| 3268711 | 11/1988 | Japan | . |
| 1210405 | 8/1989 | Japan | . |
| 1240503 | 9/1989 | Japan | . |
| 1272607 | 10/1989 | Japan | . |
| 3200812 | 12/1989 | Japan | . |
| 3200814 | 12/1989 | Japan | . |
| 3275703 | 3/1990 | Japan | . |
| 2182709 | 7/1990 | Japan | . |
| 2235911 | 9/1990 | Japan | . |
| 3153713 | 7/1991 | Japan | . |
| 3212408 | 9/1991 | Japan | . |
| 3263410 | 11/1991 | Japan | . |
| 8803540 | 5/1988 | WIPO | . |
| 8810275 | 12/1988 | WIPO | C08F 4/64 |
| 9103500 | 3/1991 | WIPO | C08F 10/00 |
| 9104282 | 4/1991 | WIPO | C08F 12/32 |
| 9106582 | 5/1991 | WIPO | C08F 110/04 |

PROCESS FOR PRODUCING AMORPHOUS SYNDIOTACTIC POLYSTYRENE

Field of Invention

This invention relates to the production of syndiotactic polystyrene in high yield using a titanium, hafnium or zirconium arene complex as catalyst in the presence of a co-catalyst. More particularly this invention relates a process for producing a hard, substantially rigid, syndiotactic polystyrene having a molecular weight in the range 100,000–1,700,000 which may be adapted to produce commercially valuable products by reaction injection moulding.

BACKGROUND OF INVENTION AND PRIOR ART

Polystyrene produced by conventional radical polymerization is amorphous and has an atactic configuration. It is, however, possible to produce other forms of polystyrene with more stereoregular configurations such as isotactic and syndiotactic polystyrene. As the degree of syndiotacticity increases, the melting point rises and the material has excellent heat and chemical resistance.

Syndiotactic polystyrene is polystyrene wherein the phenyl groups pendent from the chain alternate with respect to which side of the chain the phenyl groups are pendent, i.e. every other phenyl group is on the opposite side of the chain. Isotactic polystyrene has all of the phenyl groups on the same side of the chain while atactic polystyrene, which is the standard or normal, has the phenyl groups randomly oriented with no discernable pattern.

Syndiotactic polystyrenes may be prepared by polymerization using any one of numerous catalysts based on a variety of titanium, zirconium, and hafnium compounds. One such catalyst system has been described by Pellecchia et al in Macromol Chem. Rapid Commun. 13, 265–268 (1992) and is based on Cp*Ti(CH$_3$)$_3$ where Cp*=η-pentamethylcyclo pentadienyl, activated with tris(pentafluorophenyl)boron [B(C$_6$F$_5$)$_3$], in a toluene solvent, which was used at a temperature of 50° C. to produce less than 50% yield of syndiotactic polystyrene. It is possible that Pellecchia et al failed to obtain the syndiotacticity and yields reported in the present application because they (a) did not maintain the solvent catalyst and co-catalyst rigorously anhydrous and anaerobic, and/or (b) did not completely remove all traces of styrene inhibitor from the styrene starting monomer. By "rigorous anhydrous and anaerobic conditions" is meant the solvent is dried by refluxing over sodium-benzophenone followed by distillation under nitrogen. The catalyst is purified by recrystallization from hexanes and is stored only briefly under nitrogen at −25° C. The co-catalyst is purified by sublimation and stored under nitrogen at −25° C. Attention is also directed to U.S. Pat. Nos. 4,978,730; 5,045,517; 5,132,380 and 5,169,893 which describes alternate catalyst systems for the production of syndiotactic polystyrene and other olefins.

It has now been determined that very much higher yields of an amorphous syndiotactic polystyrene at high rates of production can be achieved by careful temperature control below about 70° C. The rate of reaction and final yield (i.e. ratio of finished polymer to starting monomer) can be controlled so that the process is amenable to reaction injection moulding (RIM) of hard, rigid, finished product which maintains the shape of the reaction vessel. It has also been determined that the ratio of catalyst to co-catalyst and the type of catalyst solvent employed markedly influence the degree of syndiotacticity achieved.

It will be appreciated by those skilled in the an that yields in the order of 50% are insufficient to produce a hard rigid product as too much liquid monomer is retained in the final product.

OBJECT OF INVENTION

It is, therefore, an object of the present invention to provide an improved process for the production of syndiotactic polystyrene.

It is another object to provide a process for reaction injection moulding of hard, rigid syndiotactic polystyrene articles.

Another object is to provide an amorphous polystyrene which is at least 96% syndiotactic.

SUMMARY OF INVENTION

Thus, by one aspect of this invention, there is provided a process for preparing an amorphous styrene polymer having a stereoregular structure greater than 96% syndiotactic which comprises polymerizing a vinyl aromatic monomer having the formula:

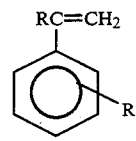

wherein each R is independently hydrogen, an aliphatic, cycloaliphatic or aromatic hydrocarbon group having from 1–10 carbon atoms in a reaction vessel in the presence of a catalyst comprising Cp*M(CH$_3$)$_3$, where Cp* is a single η$^5$-cyclopentadienyl or an η$^5$-cyclopentadienyl group optionally covalently bonded to M through a substituent and M is selected from Ti, Zr and Hf and a co-catalyst comprising B(C$_6$F$_5$)$_3$ dissolved in an aromatic solvent under rigorously anhydrous conditions while maintaining the temperature of said reaction vessel in the range −15° C. to +50° C., and wherein the ratio of catalyst: co-catalyst is in the range 1:1 to 1:0.5.

By another aspect of this invention there is provided an amorphous styrene polymer having a stereoregular structure greater than 96% syndiotactic, a molecular weight in the range 100,000 to 1,700,000 and an Mw/Mn ratio of at least 2.03.

DETAILED DESCRIPTION OF PREFERRED EMBODIMENTS

Suitable vinyl aromatic monomers which can be used in this invention include those of the formula:

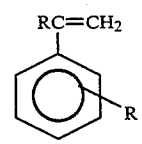

where R is independently hydrogen; an aliphatic, cycloaliphatic or aromatic hydrocarbon group having 1–10 carbon atoms. Examples of such monomers include styrene, n-butyl styrene and p-vinyl styrene with styrene being especially suitable. All traces of inhibitor should be removed from the monomer before use by passage through a commercially available inhibitor removal column such as that sold by the Aldrich Chemical Company.

Illustrative, but not limiting examples of monocyclopentadienyl metal components which may be used in the preparation of the catalysts of this invention are derivatives of titanium, zirconium, or hafnium. Preferred components are titanium or zirconium compounds with titanium being the most preferred. Examples of suitable monocyclopentadienyl metal compounds are hydrocarbyl-substituted monocyclopentadienyl metal compounds such as cyclopentadienylzirconium trimethyl, cyclopentadienylzirconium triethyl, cyclopentadienylzirconium tripropyl, cyclopentadienyltitanium trimethyl, cyclopentadienyltitanium triphenyl, etc; hydrocarbyloxy substituted compounds such as cyclopentadienyltitanium triisopropoxide, cyclopentadienylzirconium triphenoxide, etc.; and compounds comprising mixtures of substituents such as cyclopentadienyltitanium isopropoxide dimethyl, pentamethylcyclopentadienylzirconium methyl dichloride, (tertbutylamido)dibenzyl(tetramethyl-$\eta^5$-cyclopentadienyl)silanezirconium dibenzyl, (phenylphosphido)-dimethyl(tetramethyl-$\eta^5$-cyclopentadienyl)silanezirconium dibenzyl, and the like.

The compositions of the present invention will be illustrated by reference to polymerizing styrene using Cp*Ti(CH$_3$)$_3$, where Cp* is $\eta$-pentamethylcyclopentadienyl, as catalyst with B(C$_6$F$_5$)$_3$, dissolved in various solvents, as co-catalyst. As described in more detail hereinafter, styrene and toluene are preferred solvents. The ratio of catalyst: co-catalyst and the polymerization temperature, between about −50° C. and 70° C., both affect the yield and properties of the polystyrene obtained. In general higher temperature reactions are virtually instantaneous and essentially quantitative resulting in the formation of a very hard, dark solid which maintains the shape of the reaction vessel.

In each of the polymerization processes described in detail hereinbelow, the reactions were carried out under an inert argon atmosphere, while maintaining rigorously anhydrous and anaerobic conditions as both the catalyst and co-catalyst are highly reactive with water and oxygen. The solvents were dried by refluxing over sodium-benzophenone followed by distillation under nitrogen. The catalyst and co-catalyst were purified as above and stored for as short a time as possible under nitrogen at −25° C. Styrene (typically 2 mL) from which all traces of inhibitor had been removed by passing through a commercially available inhibitor removal column and Cp*TiMe$_3$ were introduced into a flask and polymerization was initiated by rapid addition of B(C$_6$F$_5$)$_3$ dissolved in a selected aromatic solvent. The preferred solvents were toluene or inhibitor-free styrene but other aromatic solvents such as m-xylene, p-xylene, mesitylene, and anisole are also contemplated.

After a selected time, which varied from a few seconds up to about 40 minutes depending upon the temperature selected, the polymerization was terminated by the addition of an acidic methanol solution. Preferably, but not essentially, the acid was 1% hydrochloric acid. The resulting polymer was then washed with methanol and dried to constant weight. Entrained catalyst was removed from the very hard, off-white, amorphous polymer by solubilizing in 1, 2, 4-trichlorobenzene or other suitable solvent (such as 1, 1, 2, 2-tetrachloroethane) at 130° C. followed by precipitation in 1% HCl in methanol. The precipitated polymer was then washed a number of times with methanol and dried in vacuo at 80° C. The polymer products formed were separated into acetone-insoluble and acetone-soluble fractions using a Soxhlet extractor. Differential scanning colorimetric (DSC) measurements were obtained using a Mettier TA 3000 system. Gel permeation chromatograms (GPC) of the polymers were obtained at 145° C. in 1, 2, 4-trichlorobenzene (0.1% by weight) using a Waters model 150-C GPC and the data was analyzed using polystyrene calibration curves. The $^{13}$C{$^1$H}NMR spectra of acetone-insoluble samples were recorded at 120° C. in (CD$_2$Cl)$_2$ using a Bruker CXP 200 MHz spectrometer, and the $^{13}$C{$^1$H}NMR spectra of acetone-soluble samples were recorded at room temperature in CDCl$_3$ using a Bruker AM 400 MHz spectrometer.

EXAMPLE 1

Effect of temperature on styrene polymerization

The effect of temperature on styrene polymerization was investigated between −50° C. and 70° C. using toluene as solvent. A thermostatted water bath was used for high temperature rum, and slush bath were used for low temperature runs, and the temperatures given below for the slush baths are probably reasonably correct. However, as the polymerization processes are highly exothermic, runs initiated near room temperature could not be controlled and became significantly warmer within seconds. At the higher temperatures, solidification of the polymer product occurred very rapidly (within 15 seconds). As the temperature was lowered, solidification occurred more slowly. Indeed, at −50° C., up to 40 minutes were required for complete solidification. Table 1 shows that a decrease of polymerization temperature from 70° C. to −50° C. results in a decrease in the amount of syndiotactic material in the polymer product.

Except for reactions at lowest temperatures, the major product was an acetone-insoluble fraction of relatively high Mw and low polydispersities (hereafter fraction A); relatively smaller amounts of acetone-insoluble (hereafter fraction B) and acetone-soluble (hereafter fraction C) polymers, both of lower Mw, were also formed. The fraction A obtained at 0° C. was found to be completely amorphous, while that formed at 70° C. was largely amorphous, but with some crystallinity (X-ray diffraction). Table 1 summarizes the properties of the three fractions formed at various temperatures.

TABLE 1

| T/°C. | | Mw(× 10$^6$) | Mw/Mn | Tg/°C. | Tm/°C. | % A + B | Total Yield (%) |
|---|---|---|---|---|---|---|---|
| POLYMER PROPERTIES$^a$ | | | | | | | |
| 70 | A | 0.124 | 2.36 | 97.3 | 274.2 | 99 | 98 |
|  | B | 0.031 | 1.61 | | | | |
|  | C | 0.013 | 1.50 | | | | |
| 60 | A | 0.395 | 2.89 | 101.2 | 272.3 | 98 | 98 |
|  | B | 0.031 | 1.50 | | | | |

TABLE 1-continued

| T/°C. | | Mw(× 10⁶) | Mw/Mn | Tg/°C. | Tm/°C. | % A + B | Total Yield (%) |
|---|---|---|---|---|---|---|---|
| | C | 0.011 | 1.59 | | | | |
| 40 | A | 0.313 | 2.36 | 102.4 | 273.9 | 98 | 97 |
| | B | 0.027 | 1.52 | | | | |
| | C | 0.014 | 1.53 | | | | |
| RT | A | 0.796 | 1.97 | 103.6 | 272.8 | 96 | 98 |
| | B | 0.052 | 1.49 | | | | |
| | C | 0.012 | 1.30 | | | | |
| 10 | A | 1.210 | 2.24 | 103.9 | 271.7 | 95 | 96 |
| | B | 0.051 | 1.96 | | | | |
| | C | 0.013 | 1.46 | | | | |
| 0 | A | 1.679 | 2.19 | 104.3 | 260.4 | 70 | 95 |
| | B | 0.050 | 1.52 | | | | |
| | C | 0.018 | 1.56 | | | | |
| −15 | A | 1.545 | 2.62 | 101.8 | 252.7 | 68 | 94 |
| | B | 0.049 | 2.01 | | | | |
| | C | 0.014 | 1.48 | | | | |
| −30 | A | 0.78 | 2.03 | 107.1 | 266.2 | 64 | 94 |
| | B | 0.047 | 1.20 | | | | |
| | C | 0.013 | 1.34 | | | | |
| −50 | A | 0.047 | 1.87 | 107.2 | 266.2 | 19 | 92 |
| | B | | | | | | |
| | C | 0.016 | 1.55 | | | | |

[a]polymerization conditions: Cp*TiMe₃ = 0.03 mmol, B(C₆F₅)₃ = 0.03 mmol, styrene = 2.0 mL, toluene = 2.0 mL. (RT = room temperature).

Fractions A and B were sufficiently soluble at 120° C. in (CD$_2$Cl)$_2$ that $^{13}$C{$^1$H}NMR spectra could be run; spectra of selected samples indicated the presence of 100% rrrr pentads, ie. the materials are syndiotactic polystyrene (SPS). Fraction C exhibits a much lower molecular weight distribution and, on the basis of $^{13}$C{$^1$H}NMR, is largely atactic in nature (APS).

EXAMPLE 2

Effect Of catalyst: co-catalyst ratio on styrene polymerization

Styrene polymerization was investigated briefly using different catalyst: co-catalyst ratios in the presence of toluene as the solvent at room temperature (Table 2 below). The remaining polymerization conditions were identical to those of Example 1. Under the conditions studied, solidification of the polymer was achieved within 15 seconds.

TABLE 1

| Catalyst Co-catalyst | | Mw(× 10⁶) | Mw/Mn | Tg/°C. | Tm/°C. | % SPS | Total Yield (%) |
|---|---|---|---|---|---|---|---|
| 1:2 | A | 0.346 | 2.17 | 104.8 | 270.3 | 90 | 96 |
| | B | 0.013 | 1.54 | | | | |
| | C | 0.011 | 1.53 | | | | |
| 1:1 | A | 0.796 | 1.97 | 103.6 | 272.8 | 96 | 98 |
| | B | 0.050 | 1.50 | | | | |
| | C | 0.012 | 1.56 | | | | |
| 1:0.5 | A | 0.702 | 2.16 | 106.3 | 269.8 | 98 | 98 |
| | B | 0.061 | 1.59 | | | | |
| | C | 0.012 | 1.45 | | | | |

EFFECT OF CATALYST: CO-CATALYST RATIO ON STYRENE POLYMERIZATION

From Table 2, it is apparent that when the concentration of the co-catalyst was decreased, the polymer formed had higher molecular weights and lower polydispersities. In addition, when the concentration of the co-catalyst was high the syndiotacticity of the polymer product was decreased.

EXAMPLE 3

Effect of solvent polarity on styrene polymerization

The effect of solvent polarity on styrene polymerization was investigated for eight different solvent systems, and Table 3 (below) contains the results of one minute polymerizations at room temperature.

Polymer formation occurred very rapidly and in high yield. In reactions 1 to 4, solidification of the polymer product occurred within 30 seconds while in reaction 5, a fine powder that was insoluble in acetone precipitated. The solid SPS products that form have high molecular weights and again exhibit bimodal molecular weight distributions. In particular, the polymer of highest molecular weight was formed when styrene itself was used as a solvent medium. This reaction was uncontrollably rapid and the reaction mixture became very warm. Separation of the two fractions was obtained for reaction 1 only. In reactions 6 to 8, the polymer products were very soluble in acetone and of low molecular weights. Polymerization did not occur in ether solvents, eg. n-butyl ether, THF or ethyl ether.

TABLE 3

EFFECT OF SOLVENT ON STYRENE POLYERMIZATION[a]

| Reaction | Solvent | Mw (× 10⁶) | Mw/Mn | Tg | Tm | Total Yield % |
|---|---|---|---|---|---|---|
| 1 | styrene | 0.527(A) 0.018(C) | 3.76 1.68 | 100.7 | 269.2 | 98 |
| 2 | m-xylene | 0.445 | 13.44 | 121.8 | 270.0 | 96 |
| 3 | p-xylene | 0.436 | 17.99 | 117.9 | 268.9 | 97 |
| 4 | mesitylene | 0.276 | 11.95 | 111.1 | 269.7 | 94 |

TABLE 3-continued

EFFECT OF SOLVENT ON STYRENE POLYERMIZATION[a]

| Reaction | Solvent | Mw (× 10⁶) | Mw/Mn | Tg | Tm | Total Yield % |
|---|---|---|---|---|---|---|
| 5 | anisole | 0.043 | 2.28 | 117.8 | 259.9 | 89 |
| 6 | benzene | 0.037 | 2.67 | 101.4 | | 82 |
| 7 | choro-benzene | 0.029 | 2.45 | 103.8 | | 79 |
| 8 | dichloro-ethane | 0.022 | 3.6 | 99.8 | | 81 |
| 9 | toluene | 0.796 | 1.97 | 103.6 | 272.8 | 98 |

[a]polymerization conditions are the same as those in Table 1 at room temperature. The data of reactions 2–8 refer to total, unfractionated polymer.

We claim:

1. A process for preparing an amorphous styrene polymer having a stereoregular structure greater than 96% syndiotactic and in a yield of at least 79% which comprises polymerising a styrene monomer having the formula:

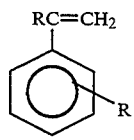

wherein each R is independently hydrogen, an aliphatic, cycloaliphatic or aromatic hydrocarbon group having 1–10 carbon atoms in a reaction vessel in the presence of a catalyst comprising Cp*M(CH$_3$)$_3$ where M is selected from titanium, zirconium and hafnium and Cp* is a single η-cyclopentadienyl or an η$^5$-cyclopentadienyl group optionally covalently bonded to M through a substituent and a co-catalyst comprising B(C$_6$F$_5$)$_3$ dissolved in an aromatic solvent under rigorously anhydrous and anaerobic conditions while maintaining the temperature of said reaction vessel in the range −15° C. to +40° C., and wherein the ratio of catalyst: co-catalyst is in the range 1:1 to 1:0.5.

2. A process as claimed in claim 1 wherein said catalyst comprises Cp*Ti(CH$_3$)$_3$.

3. A process as claimed in claim 2 wherein Cp* is η$^5$-pentamethylcyclopentadienyl.

4. A process as claimed in claim 3 wherein said aromatic solvent is selected from the group consisting of: styrene, toluene, m-xylene, p-xylene, mesitylene, and anisole.

5. A process as claimed in claim 4 wherein said aromatic solvent is selected from styrene and toluene.

6. A process as claimed in claim 1 wherein said reaction vessel comprises a reaction injection mould.

7. A process as claimed in claim 1 wherein the conversion of said styrene monomer to said syndiotactic polymer is at least 92%.

* * * * *